Figure 1:
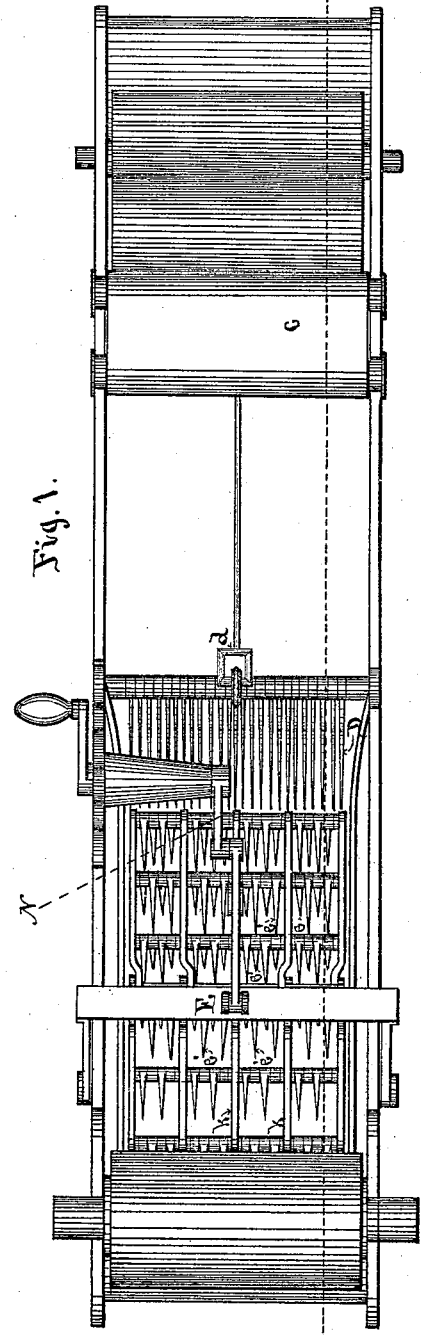

(No Model.)  2 Sheets—Sheet 1.

F. G. SARGENT.
WOOL WASHING MACHINE.

No. 250,758.  Patented Dec. 13, 1881.

Witnesses:
David Hall Rice
N. P. Orkington

Inventor.
F. G. Sargent

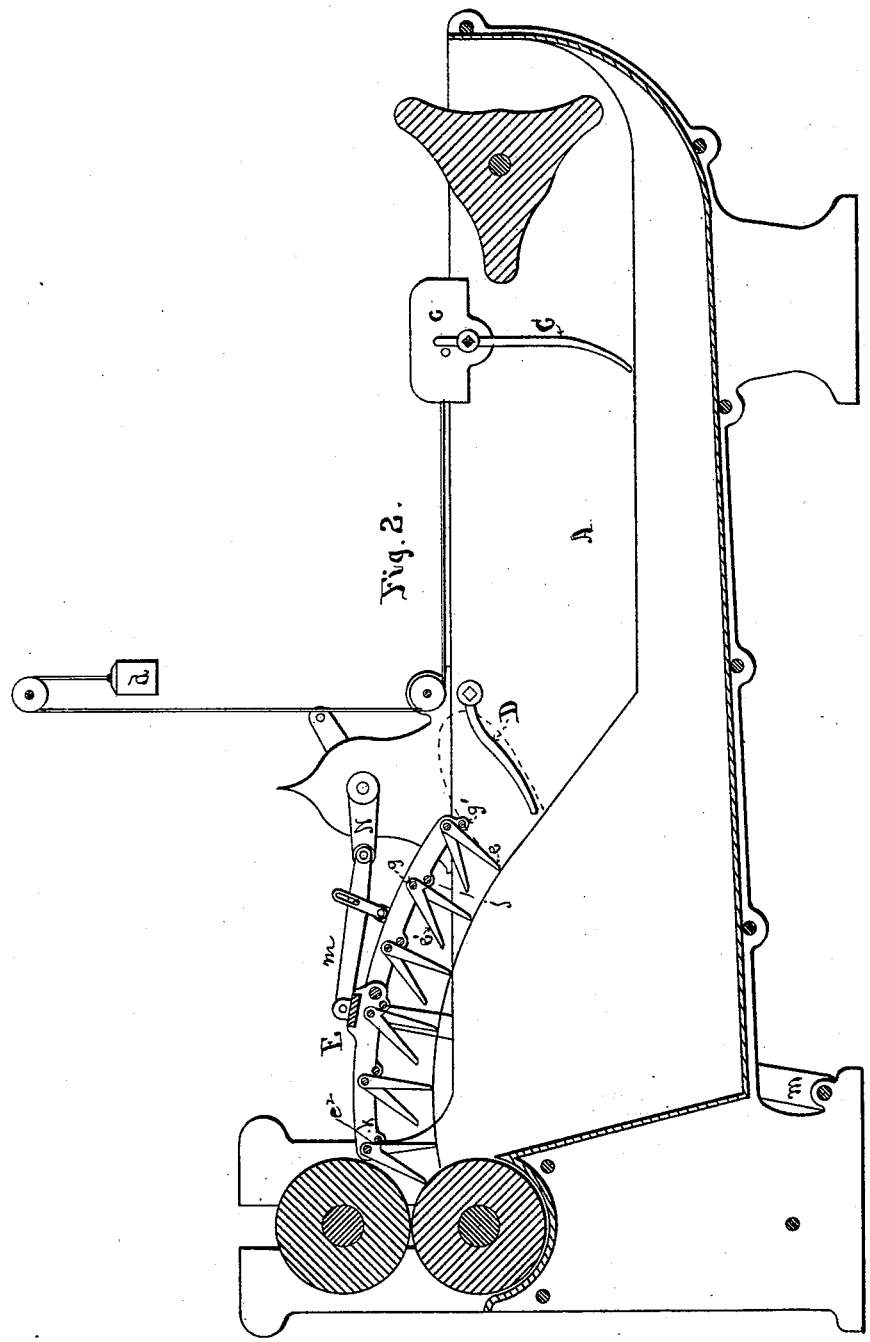

UNITED STATES PATENT OFFICE.

FREDERICK G. SARGENT, OF GRANITEVILLE, MASSACHUSETTS.

WOOL-WASHING MACHINE.

SPECIFICATION forming part of Letters Patent No. 250,758, dated December 13, 1881.

Application filed December 9, 1880. (No model.)

*To all whom it may concern:*

Be it known that I, FREDERICK G. SARGENT, of Graniteville, county of Middlesex, and State of Massachusetts, have invented a new and useful Improvement in Wool-Washing Machines, of which the following is a specification.

My invention relates to machines in which the wool, after being saturated in a bowl containing a scouring-liquid, is passed up over an inclined apron to a pair of squeeze-rolls, which squeeze out the liquid which fails to drain out as the wool passes over the apron; and the objects of my improvement are to provide a carrier which will move the wool over the apron from the bowl to the squeeze-rolls in an even sheet, and, if the wool be fed to it unevenly, to even it out as it passes over the apron, and to provide a mechanism by which the wool will be pressed forward while in the bowl, with a uniform and steady pressure, toward the squeeze-rolls. I accomplish these objects by the mechanism illustrated by the accompanying drawings, in which—

Figure 1 is a plan of a machine embodying my improvement. Fig. 2 is a section through line $x\ x$ of Fig. 1.

A is a bowl, into which the wool is placed, which contains the scouring-liquid.

C is a swinging rake, carried in a frame, $c$, which slides or rolls on trucks upon the edges of the bowl. This frame is pulled back by hand toward the end of the bowl at which the wool is put in, the rake swinging up and its teeth sliding over the wool in the bowl until being released, the weight $d$ draws it toward the squeeze-rolls, when the teeth will be projected down into the wool, pressing all the mass of wool in advance of the rake forward toward the rolls with a pressure dependent upon the gravity of the weight used. The wool, being thus pressed forward toward the rolls, is crowded against the swinging rake D, and the carrier E, provided with teeth $e\ e'$, will, with its backward movement, drop its rear teeth through the rake D and withdraw or draw under it a portion of the wool contained in the bowl, when the rake C will, by its constant pressure, crowd forward the wool against the rake D, so that each movement of the carrier E will continue to take a small portion of the wool from the bowl. The carrier E is provided with teeth $e$ and $e'$, both swinging upon the rod $g$ and falling back against the rod $j$, which acts as a stop, the rods $g$ and $j$ being sustained in their places by the side bars, $k$, of the carrier E, the whole of which is connected to the rock-shaft arm $m$ and driven by the crank N in the usual manner. The teeth $e'$, being provided with a rear shoulder, $e^2$, which, coming in contact with the rod $j$, prevents their points from falling back as far as do those of teeth $e$, and therefore as the carrier is started forward after each backward movement the teeth $e'$, coming first into operative position, begin to move the wool forward before the teeth $e$ begin to act upon it, and thereafter, when, the teeth $e$ arriving in operative position, all parts of the wool are moved forward together at an equal speed to the end of the movement of the carrier, when the carrier will begin its backward movement and all the teeth cease acting upon the wool at one time, and will swing forward and be dragged back upon the surface of the wool until another forward movement is begun. When, therefore, any large mass of wool is drawn under the rake D by the carrier, with each movement of the rake half of the wool of which it is composed will be acted upon and moved toward the squeeze-rolls with each stroke of the carrier before the other half is moved, and, as several movements of the carrier are necessary before the wool passes the entire distance from the bowl to the squeeze-rolls, the mass will be evened out before it reaches them and presented in better shape for their action than it would be if all the teeth moved the wool at the same time. Besides the evening of the sheet when large masses are given to the carrier, another advantage is obtained, for, though the sheet be even when first taken by the carrier, if all the teeth have precisely the same movement, the wool will, after several successive movements, be found to be accumulating in advance of each rank of teeth in greater depth than it lies behind them. This action of the carrier-teeth is entirely overcome by causing them to have a differential forward movement, as described, and the wool is delivered in a more even and perfect manner to the squeeze-rolls than with any carrier all of whose teeth operate upon the wool through the same distance while moving forward at the same time.

The arrangement shown, in which the wool in the bowl is crowded forward by a rake without being agitated in the scouring-liquid in the bowl, is especially adapted to the soaking of the wool preparatory to delivery to other machines, and the attendant can fill the bowl behind the rake, while the rake, acted upon by the weight, feeds the wool in advance of it to the carrier.

I am aware of the use of carriers having swinging teeth, as described in the Reissue Patent No. 6,961, issued February 29, 1876; and I do not claim such teeth, broadly, but only as when constructed and acting as described.

What I claim as new and of my invention is—

1. In a wool-washing machine, a carrier-frame provided with swinging teeth placed in ranks, each alternate tooth of which is provided with a stop which limits its movements, so that it swings through a less distance than the teeth adjacent in the same rank, substantially as described.

2. In a wool-washing machine, a carrier provided with swinging teeth, each alternate one of which is provided with a stop-shoulder which prevents its point from falling as low as do those of the adjacent teeth, substantially as described.

FREDERICK GRANDERSON SARGENT.

Witnesses:
ALLAN C. SARGENT,
ARTHUR B. PLIMPTON.